No. 880,382. PATENTED FEB. 25, 1908.
C. R. KEITH.
POWER TRANSMISSION APPARATUS.
APPLICATION FILED APR. 3, 1907.
3 SHEETS—SHEET 2.
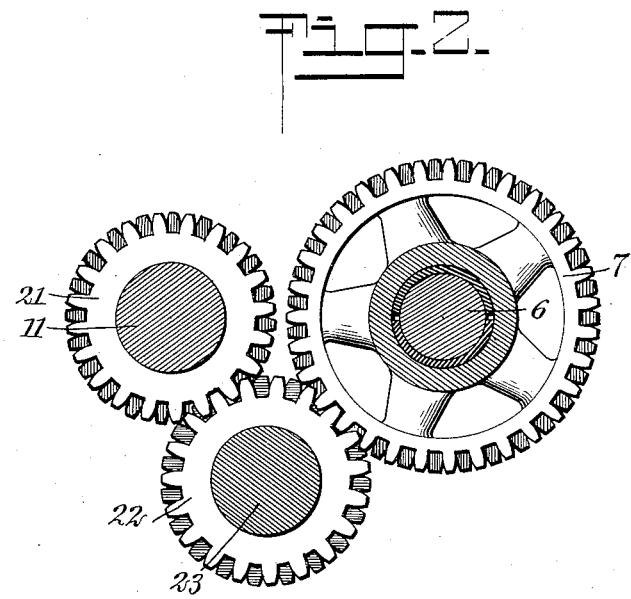
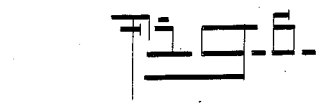
WITNESSES
INVENTOR
Charles R. Keith
BY
ATTORNEYS No. 880,382. PATENTED FEB. 25, 1908.
C. R. KEITH.
POWER TRANSMISSION APPARATUS.
APPLICATION FILED APR. 3, 1907.
3 SHEETS—SHEET 3.
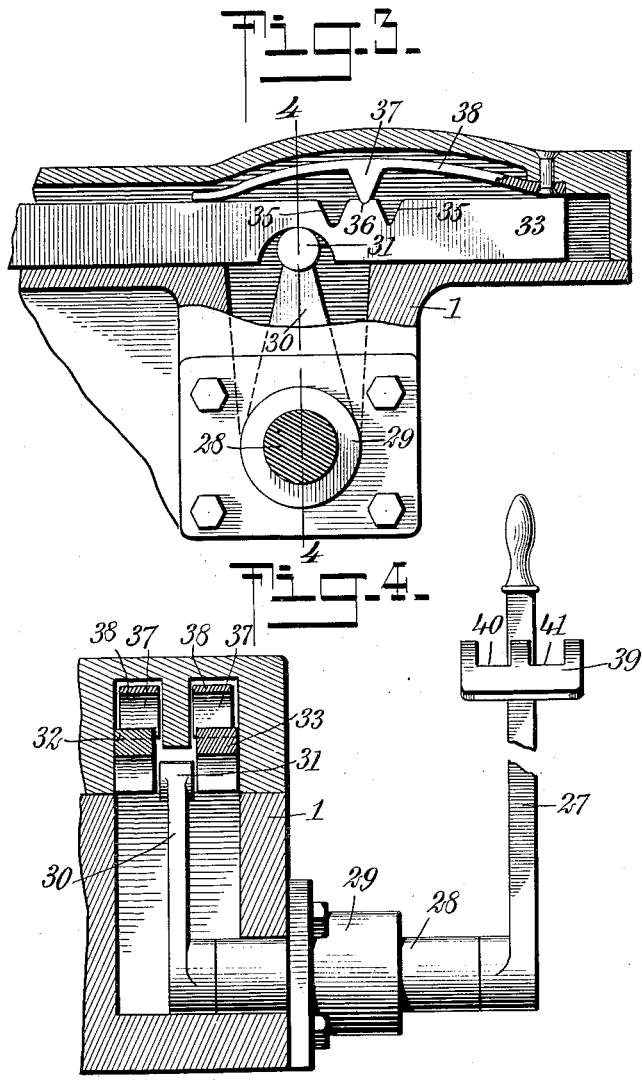
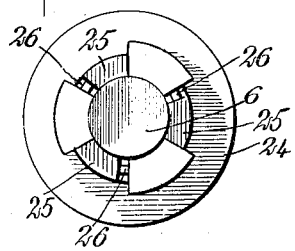
WITNESSES
INVENTOR
Charles R. Keith
BY
ATTORNEYS

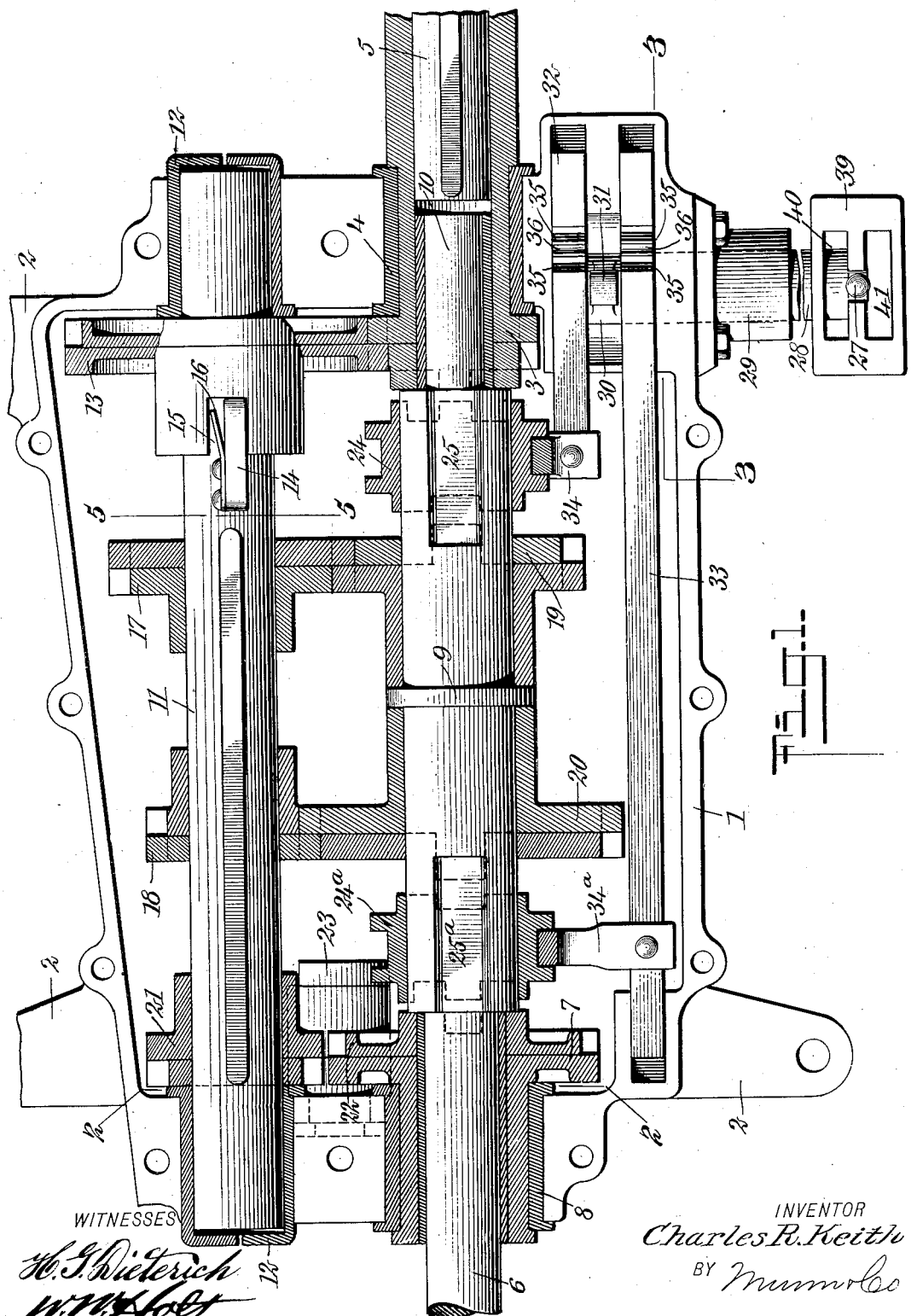

UNITED STATES PATENT OFFICE.

CHARLES R. KEITH, OF TARRYTOWN, NEW YORK, ASSIGNOR OF ONE-HALF TO JOHN WILLIAM MASON, OF TARRYTOWN, NEW YORK.

POWER-TRANSMISSION APPARATUS.

No. 880,382.  Specification of Letters Patent.  Patented Feb. 25, 1908.

Application filed April 3, 1907. Serial No. 366,171.

*To all whom it may concern:*

Be it known that I, CHARLES R. KEITH, a citizen of the United States, and a resident of Tarrytown, in the county of Westchester and State of New York, have invented a new and Improved Power-Transmission Apparatus, of which the following is a full, clear, and exact description.

This invention has in view the provision of an improved power transmission apparatus, more especially designed for motor vehicles, and in which a driving shaft is adapted to positively drive a driven shaft at more than two different speeds in one direction, as well as positively drive the driven shaft in the opposite direction.

The invention further provides for the operation of the apparatus without undue shock and for the reduction of noise to a minimum while the apparatus is in action.

Reference is to be had to the accompanying drawings forming a part of this specification, in which similar characters of reference indicate corresponding parts in all the figures.

Figure 1 is a plan of one embodiment of my invention partly in section and with one side of the casing removed; Fig. 2 is a section on the line 2—2 of Fig. 1, showing the gearing for the back drive; Fig. 3 is a section substantially on the line 3—3 of Fig. 1; Fig. 4 is a section on the line 4—4 of Fig. 3, showing the controlling lever in neutral position; Fig. 5 is a section through the countershaft on the line 5—5 of Fig. 1; Fig. 6 is a face view of one of the gears journaled on the driven shaft, and Fig. 7 is a face view of the forward clutch.

The invention in practice, preferably comprises a casing 1 having extended ears 2 for bolting or otherwise affixing it to the vehicle body, and of such size and shape as to neatly contain the transmission mechanism. At the forward end of the casing the hub of a gear 3 is journaled in a box 4, said hub being extended to the outside of the casing, where it is keyed or otherwise affixed to a driving shaft 5.

In alinement with the driving shaft 5 a driven shaft 6 passes through the opposite end of the casing and is journaled in the hub of a gear 7, the hub of the gear being also journaled in the casing in a box 8, the said gear 7 being preferably directly inside of the casing. The driven shaft 6 forward of the gear 7 is enlarged and constructed with a central collar 9 and with a forward reduced end 10 journaled in the hub of the gear 3. At the opposite side of the casing from the driving and driven shafts, a counter-shaft 11 is journaled at its opposite ends in boxes 12 carried by the casing. The counter-shaft 11 is provided with a gear 13 loosely mounted thereon and of somewhat larger diameter than, and in mesh with the gear 3. A limited, relative, rotary movement between the shaft 11 and the gear 13 is provided by keys 14 fixed to and protruding from the countershaft, each key projecting into a notch 15 formed in the hub of the gear and carrying a spring 16, which presses the gear in the opposite direction from which it is revolved by the gear 3.

Fixed to the countershaft 11 at opposite sides of its center, are gears 17 and 18, respectively, in mesh with gears 19 and 20 journaled on the driven shaft 6 at opposite sides of the collar 9. The gears 17 and 19 are of substantially the same size; whereas the gears 18 and 20 are of different size, operating to give different driving speeds to the driven shaft from the driving shaft when connected therewith.

Fixed to the countershaft 11, opposite the gear 7 fixed to the driven shaft 6, is a gear 21 in mesh with an intermediate gear 22, the latter being also in mesh with the gear 7 and journaled on a stud 23 carried at the rear end of the casing, this disposition of the last-named gears operating when in driving action, to drive the driven shaft from the driving shaft through the countershaft in a reverse direction and at a reduced speed from the driving shaft.

The opposed faces of the gears 3 and 19 are constructed with clutch surfaces, with either of which a clutch 24 is adapted to engage. This clutch, as best shown in Fig. 7, is splined to the driven shaft 6 by radial keys 25, the openings in the clutch for receiving these keys being of slightly greater width to receive flat springs 26 which operate to turn the clutch on the shaft in the direction in which the driving shaft 5 is driven and permit the clutch to have a slight yielding, rotary movement independent of said shaft. The gears 7 and 20 are likewise provided with clutch surfaces on their opposed faces, which are adapted to be engaged by a clutch 24ª slidably keyed to the driving shaft 6 by radial keys 25ª, this clutch being in all respects the same as the clutch 24 except that the springs 26 are omitted and no relative rotation between the clutch and the shaft is provided for.

For shifting the clutches 24 and 24ª on the driven shaft is provided a controlling lever 27 fixed to a shaft 28 journaled in a bearing 29 carried at one side of the casing 1, an arm 30 being fixed to this shaft within the casing, said arm having an enlarged head 31 adapted to engage in recesses formed on the under face of shifting bars 32 and 33, both of which are slidably mounted in suitable guide-ways formed in the casing, such a guide-way being provided at both ends of the casing for the bar 33, as shown in Fig. 1. The bar 32, which is somewhat shorter, carries an arm 34 at its rear extremity, which engages an annular groove in the circumference of the clutch 24. The bar 33 carries an arm 34ª engaging with the annular groove in the rear clutch 24ª. Both the bars 32 and 33 are formed with deep, V-shaped notches 35 and a somewhat shallower notch 36 occupying an intermediate position. These notches are designed to be engaged, when the controlling lever is operated to shift the bars, by projections 37 of like form carried on the under face of flat springs 38, a spring being provided for each bar which is rigidly secured at one end, as disclosed in Fig. 3. This particular shape of the notches 35 and projection 37 admit of their automatic disengagement when the bars are shifted, and also force the bars and the clutches carried by them, to operative position with a snap.

In Figs. 1 and 4 I have shown a quadrant 39 for guiding the controlling lever, said quadrant having two parallel slots 40 and 41 communicating with each other at the center. When the controlling lever occupies a neutral position between the slots 40 and 41, as shown in Fig. 1, the shaft 6 is idle when the driving shaft 5 is in operation. When the controlling lever is passed into the slot 40 and thrown to the forward end thereof, the clutch 24 connects the driving shaft directly with the driven shaft through the gear 3, and a direct drive of the driven shaft from the driving shaft results. If the controlling lever is thrown to the opposite and rear end of the slot 40, the driven shaft is driven from the driving shaft through the intermeshing gears 3 and 13, the countershaft 11 and the intermeshing gears 17 and 19, resulting in an indirect drive of the driven shaft from the driving shaft at a slower speed. By bringing the controlling lever to the forward end of the slot 41, engaging the clutch 24ª with the gear 20, the driven shaft is driven from the driving shaft through the intermeshing gears 3 and 13, countershaft 11 and the intermeshing gears 18 and 20, resulting in a still slower, and the slowest, drive of the driven shaft in the forward direction. If the controlling lever be carried to the rear end of the slot 41, the clutch 24ª is engaged with the gear 7, operating to drive the driven shaft from the driving shaft through the gears 3 and 13, the countershaft 11 and the gears 21, 22 and 7, shown in Fig. 2, this last-named drive of the driven shaft being somewhat slower than the revolution of the driving shaft and in the reverse direction.

In engaging the clutch 24 with the gear 3, the springs 26 permit a slight rotation of the clutch on the driven shaft and prevent the nipping off of the corners of the clutch as well as adapting the driven shaft to take up the movement of the driving shaft without undue shock. The spring 16 acting on the gear 13 carried by the countershaft performs a like function when the clutch 24 is engaged with the gear 19, or the clutch 24ª is engaged with either the gears 7 or 20.

All of the gears of the apparatus are as shown preferably made in two sections, with the teeth of one section arranged in the intervals of the teeth of the other section, this construction operating to reduce the noise of the transmission apparatus when in action, to a minimum.

Although the construction as shown and hereinbefore described is that of the preferred embodiment of my invention, I, nevertheless, regard the exact construction as immaterial and consider the invention limited in scope by the annexed claims only.

Having thus described my invention I claim as new and desire to secure by Letters Patent:

1. In a power transmission apparatus, clutches, bars for shifting said clutches, a controlling lever operable to slide either of said bars, and a spring having a projection rigidly fixed thereto directly engaging the said bars for holding them at the forward and rearward and intermediate positions of their movement.

2. In a power transmission apparatus, a driving shaft, a driven shaft, means for positively, directly and indirectly driving the driven shaft from the driving shaft, said means comprising clutches slidably splined to one of said shafts, shifting bars for sliding said clutches, a controlling lever for operating said shifting bars, and springs having projections rigidly fixed thereto and engaging said bars for retaining said clutches in active and inactive positions.

3. In a power transmission apparatus, a shifting bar, a clutch operated by said bar, and a spring having a V-shaped projection rigidly attached thereto adapted to engage with notches in said bar and retain said clutch in active and neutral position.

4. In a power transmission apparatus, a driving shaft, a driven shaft, means for driving the driving shaft from the driven shaft, comprising a clutch slidably splined to one of said shafts, and means arranged between said clutch and its spline providing for a slight, yielding relative rotation of said clutch on said shaft in one direction.

5. In a power transmission apparatus, a casing, a driving shaft, a driven shaft and a counter shaft journaled in the casing, means coöperating with the counter shaft to indirectly drive the driven shaft from the driving shaft, means for directly driving said driven shaft from the driving shaft, said means including clutches slidably splined on the driven shaft, shifting bars slidably mounted in guide-ways at opposite ends in the casing and engaged with said clutches, and a lever having means slidably and revolubly mounted in said casing for operating each of said shifting bars.

6. In a power transmission apparatus, a driving shaft, a driven shaft, a counter shaft, gears connecting said shafts together, and a key having a spring arranged at one side thereof for keying one of said gears to its shaft.

In testimony whereof I have signed my name to this specification in the presence of two subscribing witnesses.

CHARLES R. KEITH.

Witnesses:
W. W. HOLT,
EVERARD B. MARSHALL.